US011782483B2

(12) United States Patent
Lombardi et al.

(10) Patent No.: US 11,782,483 B2
(45) Date of Patent: Oct. 10, 2023

(54) UNIFORMLY NARROW DISPLAY BEZELS IN PORTABLE ELECTRONIC DEVICES

(71) Applicant: Google LLC, Mountain View, CA (US)

(72) Inventors: Michael J. Lombardi, South Barrington, IL (US); Joseph L. Allore, Mundelein, IL (US); Chi-Jer Wang, New Taipei (TW); Stuart Kyle, San Francisco, CA (US); Ssu-Chieh Yu, New Taipei (TW); Kuan-Ku Kuo, Taichung (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/507,293

(22) Filed: Oct. 21, 2021

(65) Prior Publication Data

US 2022/0043488 A1    Feb. 10, 2022

Related U.S. Application Data

(60) Provisional application No. 63/237,007, filed on Aug. 25, 2021.

(51) Int. Cl.
*G06F 1/16* (2006.01)
(52) U.S. Cl.
CPC .......... *G06F 1/1656* (2013.01); *G06F 1/1626* (2013.01)
(58) Field of Classification Search
CPC ............................ G06F 1/1626; G06F 1/1656
See application file for complete search history.

(56) References Cited

U.S. PATENT DOCUMENTS

| 10,021,226 | B2 * | 7/2018 | Gagne-Keats | C09J 163/00 |
| 10,440,839 | B2 | 10/2019 | Cheng | |
| 10,742,788 | B2 * | 8/2020 | Shin | H04M 1/0268 |
| 10,838,452 | B2 * | 11/2020 | Siddiqui | G06F 1/1601 |
| 10,890,954 | B2 * | 1/2021 | Evans | G06F 1/1601 |

(Continued)

FOREIGN PATENT DOCUMENTS

WO    2022046025    3/2022

OTHER PUBLICATIONS

"International Search Report and Written Opinion", Application No. PCT/US2020/047670, dated May 12, 2021, 13 pages.

(Continued)

*Primary Examiner* — Anthony Q Edwards
(74) *Attorney, Agent, or Firm* — Colby Nipper PLLC

(57) ABSTRACT

This document describes systems and techniques directed at uniformly narrow display bezels in portable electronic devices. In aspects, a portable electronic device includes a housing that houses a display panel stack having a chamfered, polyhedral cover layer bonded to a top of a display module. The cover layer may include a large chamfer between a top face and a side face, defining a chamfered face extending a perimeter of the cover layer. The chamfered face may be angled any number of degrees in a range from one to eighty-nine degrees to a horizontal plane defined by the top face of the cover layer, such that the chamfered face possesses a front-facing portion. The chamfered face may be adhered to a parallel or subparallel interior face of the housing. In such a configuration, an opaque border added to a face opposite of the top face may be imperceptible to a user, resulting in uniformly narrow display bezels.

8 Claims, 10 Drawing Sheets

(56) References Cited

U.S. PATENT DOCUMENTS

| | | |
|---|---|---|
| 2006/0093928 A1 | 5/2006 | Hung et al. |
| 2007/0070272 A1 | 3/2007 | Gettemy et al. |
| 2008/0123032 A1 | 5/2008 | Taniguchi et al. |
| 2010/0053853 A1* | 3/2010 | Allore ............... B29C 48/09 361/679.01 |
| 2011/0175852 A1 | 7/2011 | Goertz et al. |
| 2013/0088671 A1 | 4/2013 | Drzaic et al. |
| 2014/0118985 A1* | 5/2014 | Hassember ....... G02F 1/133526 361/814 |
| 2014/0240911 A1* | 8/2014 | Cole ................... H05K 5/03 361/679.3 |
| 2014/0265822 A1 | 9/2014 | Drzaic et al. |
| 2015/0070826 A1* | 3/2015 | Montevirgen ........ G06F 1/1656 361/679.55 |
| 2015/0138434 A1 | 5/2015 | Chuang et al. |
| 2015/0301417 A1 | 10/2015 | Park et al. |
| 2015/0331292 A1 | 11/2015 | Yang et al. |
| 2016/0227654 A1* | 8/2016 | Kim ................... G06F 1/1635 |
| 2016/0337570 A1 | 11/2016 | Tan et al. |
| 2017/0116932 A1 | 4/2017 | Musgrave et al. |
| 2017/0168463 A1 | 6/2017 | Hong et al. |
| 2017/0322357 A1 | 11/2017 | De Jong et al. |
| 2018/0260602 A1 | 9/2018 | He et al. |
| 2019/0303639 A1 | 10/2019 | He et al. |
| 2020/0117933 A1 | 4/2020 | Chang et al. |
| 2022/0050506 A1 | 2/2022 | Gehlen et al. |
| 2022/0058254 A1 | 2/2022 | Park et al. |

OTHER PUBLICATIONS

Choi, et al., "Light-Guiding Structure For Under-Display Sensor Modules", Technical Disclosure Commons; Retrieved from https://www.tdcommons.org/dpubs_series/3527, Aug. 17, 2020, 8 pages.

"International Preliminary Report on Patentability", Application No. PCT/US2020/047670, dated Feb. 28, 2023, 10 pages.

Li-Fong, et al., "A Circular Flexible Amoled Display with a 1-mm Slim Border", May 25, 2016, pp. 847-850.

Lih, et al., "A True Circular 1.39 Inch Amoled for Wearable Application", May 2016, pp. 566-569.

Lombardi, et al., "Adaptive User Interface for a Camera Aperture within an Active Display Area", Technical Disclosure Commons; Retrieved from https://www.tdcommons.org/dpubs_series/2719, Nov. 25, 2019, 12 pages.

Skanda, "Xiaomi Mi 9 to Feature an Improved In-screen Fingerprint Sensor", https://www.gizchina.com/2019/02/17/mi-9-fingerprint-improved-fingerprint/, Feb. 17, 2019, 10 pages.

"Foreign Office Action", IN Application No. 202247031876, dated Aug. 7, 2023, 7 pages.

* cited by examiner

UNIFORMLY NARROW DISPLAY BEZELS IN PORTABLE ELECTRONIC DEVICES

RELATED APPLICATION

This application claims priority under 35 U.S.C. § 119(e) to U.S. Provisional Patent Application 63/237,007, filed on Aug. 25, 2021 which is incorporated herein by reference in its entirety.

SUMMARY

This document describes systems and techniques directed at uniformly narrow display bezels in portable electronic devices. In aspects, a portable electronic device includes a housing that houses a display panel stack having a chamfered, polyhedral cover layer bonded to a top of a display module. The cover layer may include a large chamfer between a top face and a side face, which defines a chamfered face extending a perimeter of the cover layer. The chamfered face may be angled any number of degrees in a range from one to eighty-nine degrees to a horizontal plane defined by the top face of the cover layer, such that the chamfered face possesses a front-facing portion. The chamfered face may be adhered to a parallel or subparallel interior face of the housing. In such a configuration, an opaque border added to a face opposite of the top face may be imperceptible to a user, resulting in uniformly narrow display bezels.

This Summary is provided to introduce simplified concepts of systems and techniques directed at narrow display borders in portable electronic devices, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques directed at uniformly narrow display bezels in portable electronic devices are described in this document with reference to the following drawings.

The same numbers are used throughout the Drawings to reference like features and components.

DETAILED DESCRIPTION

Overview

This document describes systems and techniques directed at uniformly narrow display bezels in portable electronic devices. Many portable electronic devices include displays, such as light-emitting diode (LED) displays and liquid crystal displays (LCD). Portable electronic device manufactures fabricate these displays in a layered structure, often referred to as a "display panel stack," containing a cover layer (e.g., cover glass) and a display module. The display panel stack may further include, integrated within the display module or altogether separate from the display module, one or more of a touch layer (e.g., touch sensor panel) and a polarizer layer (e.g., polarization filters). The display module includes a pixel array having tens of thousands of pixels organized into a two-dimensional grid (e.g., circular grid, rectangular grid). To power and control the pixel array, display modules often include routing circuitry, surrounding the perimeter of the pixel array, connecting the pixels to one or more drivers. For example, a pixel array having a two-dimensional rectangular grid of pixels is operably coupled to one or more row-line drivers via electrical traces (e.g., wires).

Before a cover layer is bonded to the top of a display panel stack, an opaque border, often referred to as an "ink mask," may be added to the underside of the cover layer, defining a display bezel. An amount of space consumed by the electrical traces often dictates a size of the display bezel, especially in corner regions. The display bezel acts as a frame, hiding routing circuitry in an inactive area (e.g., non-emissive area) of a display. The display bezel further surrounds an active area of a display (e.g., an emissive area of a display module visible to a user).

Users of portable electronic devices often desire compact, aesthetic portable electronic devices with large display active areas. However, many displays frequently contain large display bezels, reducing a display active area. In some implementations, a display bezel may be narrower along sides of a portable electronic device but larger on a top and/or a bottom of the device. Some users prefer uniform display bezels, finding such an implementation more aesthetic in portable electronic devices. To this end, this document describes systems and techniques directed at minimizing display bezels, while simultaneously providing an aesthetic device with uniform display bezels.

Example Environment

Figure 1:
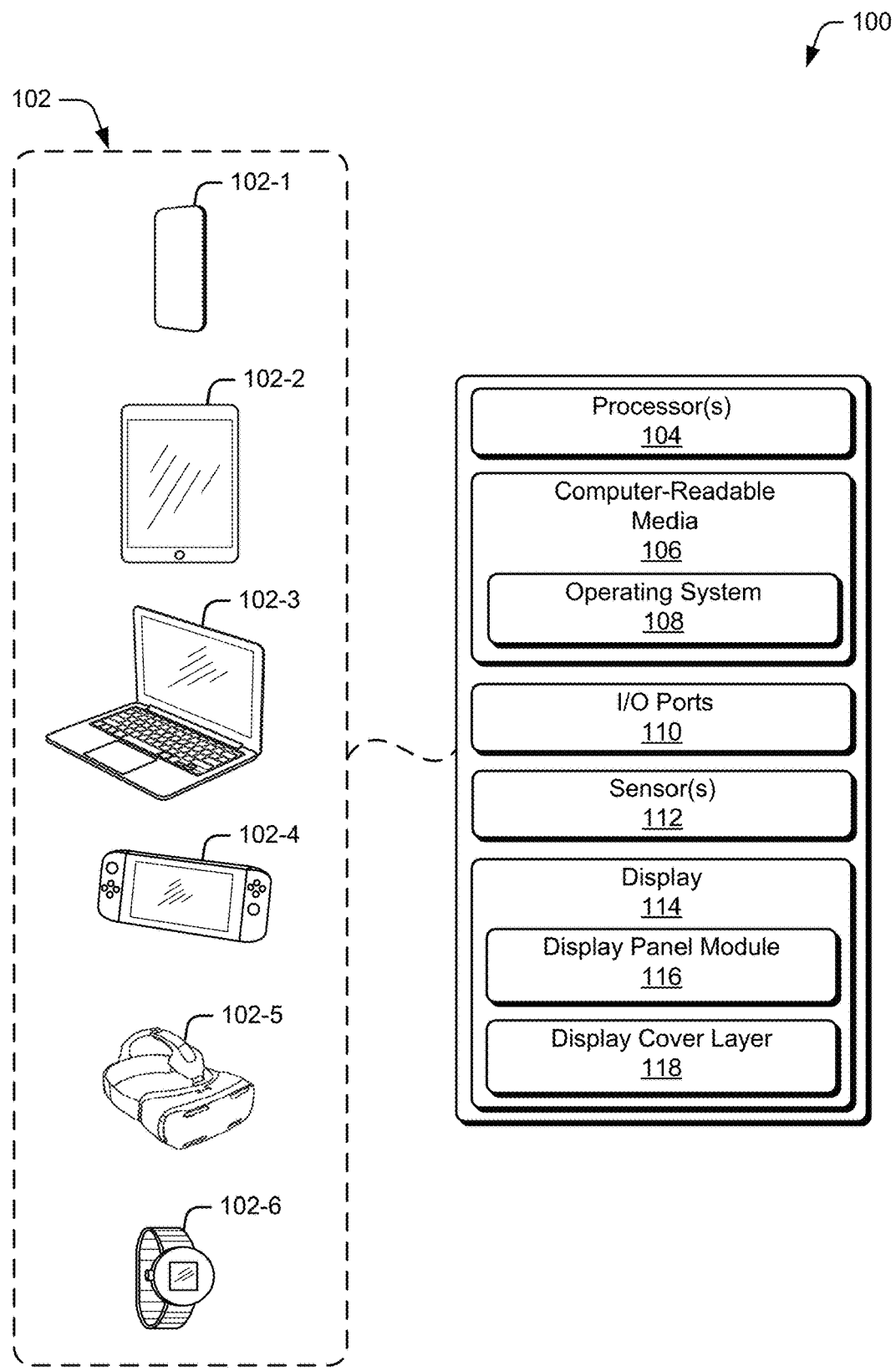
FIG. 1 illustrates an example device diagram of a portable electronic device in which uniformly narrow display bezels can be implemented.

FIG. 1 illustrates an example device diagram 100 of a portable electronic device 102 in which uniformly narrow display bezels can be implemented. The portable electronic device 102 may include additional components and interfaces omitted from FIG. 1 for the sake of clarity.

The portable electronic device 102 can be a variety of consumer portable electronic devices. As non-limiting examples, the portable electronic device 102 can be a mobile phone 102-1, a tablet device 102-2, a laptop computer 102-3, a portable video game console 102-4, virtual-reality (VR) goggles 102-5, a computerized watch 102-6, and the like.

The portable electronic device 102 includes one or more processors 104. The processor(s) 104 can include, as non-limiting examples, a system on a chip (SoC), an application processor (AP), a central processing unit (CPU), or a graphics processing unit (GPU). The processor(s) 104 generally executes commands and processes utilized by the portable electronic device 102 and an operating system installed thereon. For example, the processor(s) 104 may perform operations to display graphics of the portable electronic device 102 on a display and can perform other specific computational tasks.

The portable electronic device 102 also includes computer-readable storage media (CRM) 106. The CRM 106 may be a suitable storage device configured to store device data of the portable electronic device 102, user data, and multimedia data. The CRM may store an operating system that generally manages hardware and software resources (e.g., the applications) of the portable electronic device 102 and provides common services for applications stored on the CRM. The operating system and the applications are generally executable by the processor(s) 104 to enable communications and user interaction with the portable electronic device 102. One or more processor(s) 104, such as a GPU, perform operations to display graphics of the portable electronic device 102 on the display 114 and can perform other specific computational tasks. The processor(s) 104 can be single-core or multiple-core processors.

The portable electronic device 102 may also include input/output (I/O) ports 110. The I/O ports 110 allow the portable electronic device 102 to interact with other devices or users. The I/O ports 110 may include any combination of internal or external ports, such as universal serial bus (USB) ports, audio ports, Serial ATA (SATA) ports, PCI-express based ports or card-slots, secure digital input/output (SDIO) slots, and/or other legacy ports.

The portable electronic device 102 further includes one or more sensors 112. The sensor(s) 112 can include any of a variety of sensors, such as an audio sensor (e.g., a microphone), a touch-input sensor (e.g., a touchscreen), an image-capture device (e.g., a camera, video-camera), proximity sensors (e.g., capacitive sensors), or an ambient light sensor (e.g., photodetector). In implementations, the portable electronic device 102 includes one or more of a front-facing sensor(s) and a rear-facing sensor(s).

Further, the portable electronic device 102 includes a display 114 with a display panel stack having a display module 116 and a cover layer 118. The display module 116 may include a two-dimensional pixel array forming a rectangular grid, operably coupled to one or more row-line drivers via electrical traces. The pixel array generates light to create an image on the display 114 upon electrical activation by one or more drivers. As an example, data-line drivers provide voltage data via electrical traces to the pixel array to control the luminance of individual pixels. A section of the display module 116 (e.g., a bottom section) may include more circuitry, such as electrical traces and drivers, than other portions of the display module 116 (e.g., a top section, a side section). In such a configuration, the display module 116 can be configured such that the section having more circuitry is folded or bent in a direction opposite to the cover layer 118.

Figure 2:
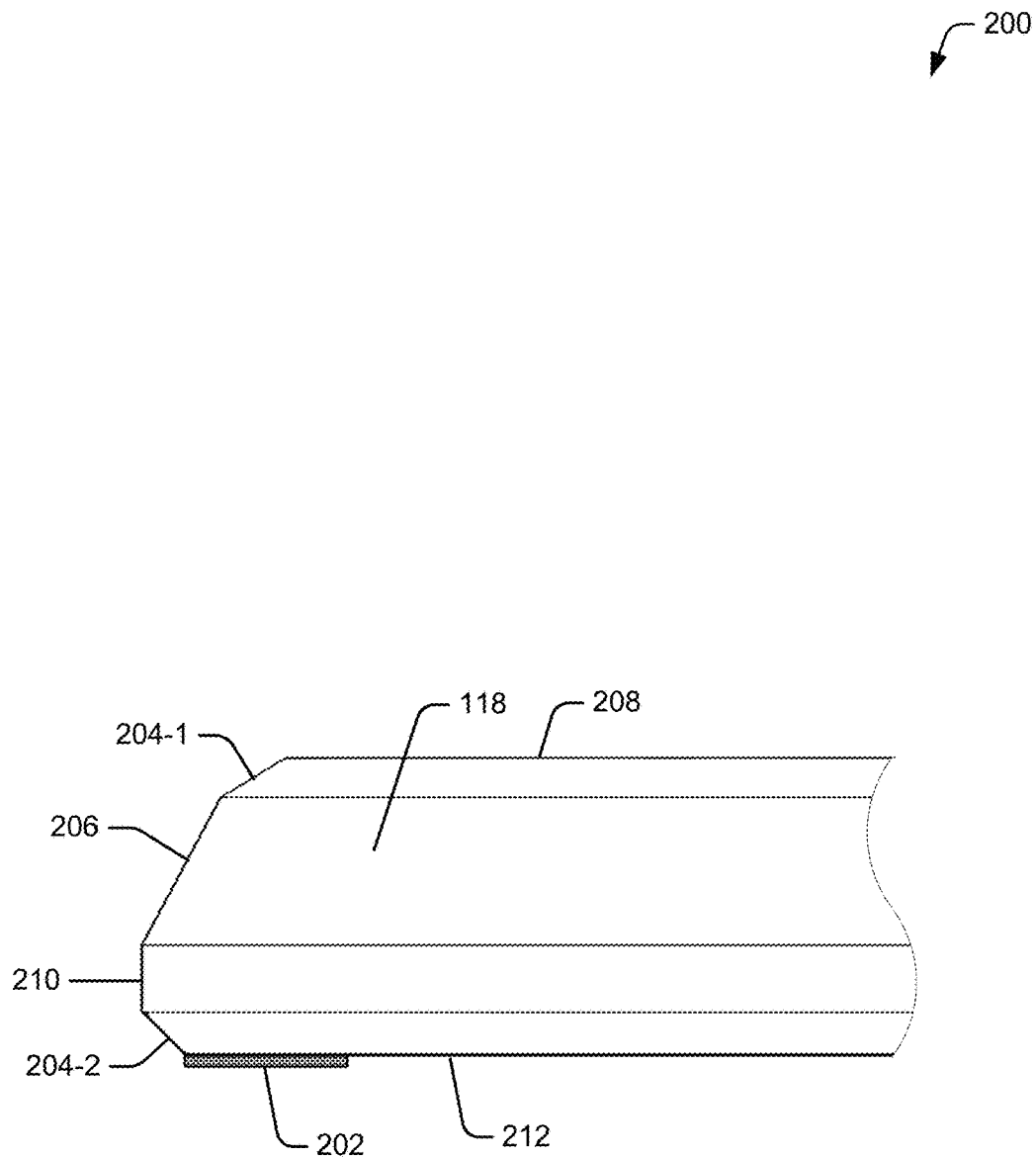
FIG. 2 illustrates a partial, cross-sectional view of an example cover layer.

FIG. 2 illustrates a partial, cross-sectional view 200 of an example cover layer 118. The cover layer 118 may be composed of any of a variety of translucent materials including polymer (e.g., plastic, acrylic), glass, and so forth, in the form of any three-dimensional shape (e.g., a polyhedron), such as a rectangular prism or cylinder. During manufacturing of the display panel stack, an opaque border 202 may first be added (e.g., laminated, printed) on a bottom face 212 (e.g., underside) of the cover layer 118. As an example, the opaque border 202 is a black ink mask printed on the bottom face 212 of the cover layer 118. The bottom face 212 of the cover layer 118 may then be bonded to the display module (e.g., display module 116) forming the display panel stack (not shown). In an implementation, the width and/or length of the display module is greater than the width and/or length of the cover layer 118. For example, the display module can extend 0.5 millimeters (mm) beyond all sides of the cover layer 118.

Further illustrated, the cover layer 118 may include one or more small chamfers 204. Although only a partial, cross-sectional view 200 is illustrated in FIG. 2, it should be understood by anyone skilled in the art, that the small chamfers 204 may extend portions or a full perimeter of any three-dimensionally shaped cover layer 118, forming a chamfered polyhedron. In an implementation, the cover layer 118 includes the small chamfers 204 (e.g., small chamfer 204-1, small chamfer 204-2) to reduce imperfections otherwise formed during manufacturing of the cover layer 118. For example, if the cover layer 118 is composed of glass, the small chamfers 204 can minimize, or altogether prevent, edge defects resulting from computer numerical control (CNC) machining operations.

The cover layer 118 further includes a large chamfer 206, a top face 208, and a side face 210. As illustrated, the large chamfer 206 is implemented between the top face 208 and the side face 210, defining a chamfered face extending portions or a full perimeter of the cover layer 118. The top face 208 may define a horizontal plane approximately perpendicular to a vertical plane defined by the side face 210. From the horizontal plane defined by the top face 208, the chamfered face may be angled any number of degrees in a range from one to eighty-nine degrees, such that the chamfered face includes a front-facing portion. For example, FIG. 2 illustrates a cover layer 118 with a chamfered face angled at approximately 62 degrees from the horizontal plane defined by the top face 208. At an angle of 62 degrees, the chamfered face, for example, possesses a front-facing portion of approximately 0.18 mm. The chamfered face angle may be implemented as having any desirable angle configured to, for example, optimize adhesive application techniques during manufacturing. As an example, the angle of the chamfered face can be designed to achieve a predetermined fluid flow of adhesive such that when adhesive is applied to the chamfered face, the viscosity of the adhesive along with the angle of the chamfered face can expedite the application of the adhesive.

Figure 3A:
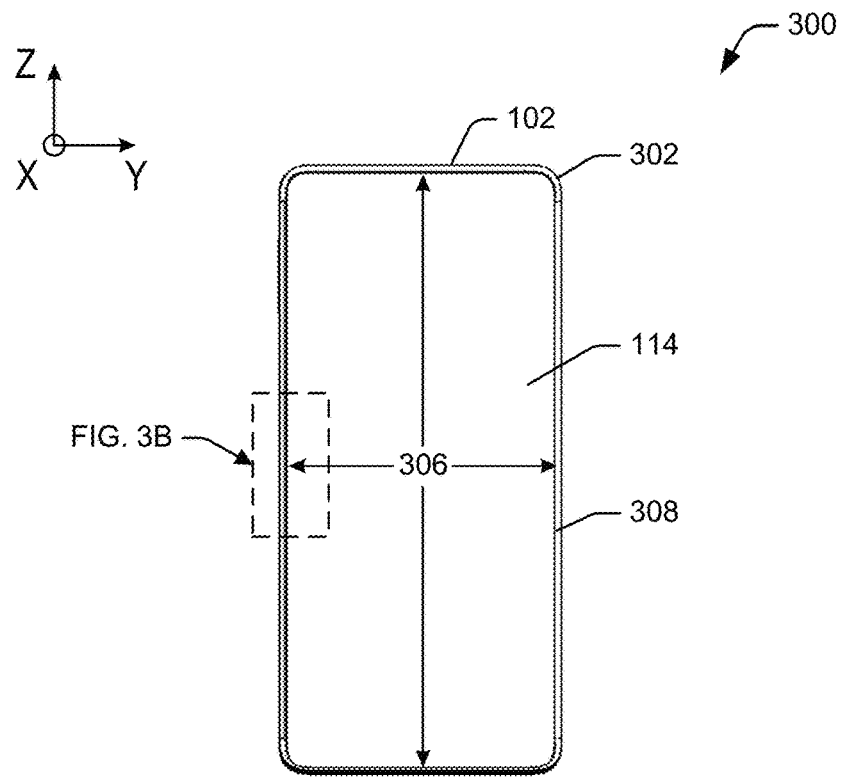
FIGS. 3A and 3B illustrate a top view and a partial, cross-sectional view, respectively, of an example portable electronic device in which uniformly narrow display bezels can be implemented.
Figure 3B:
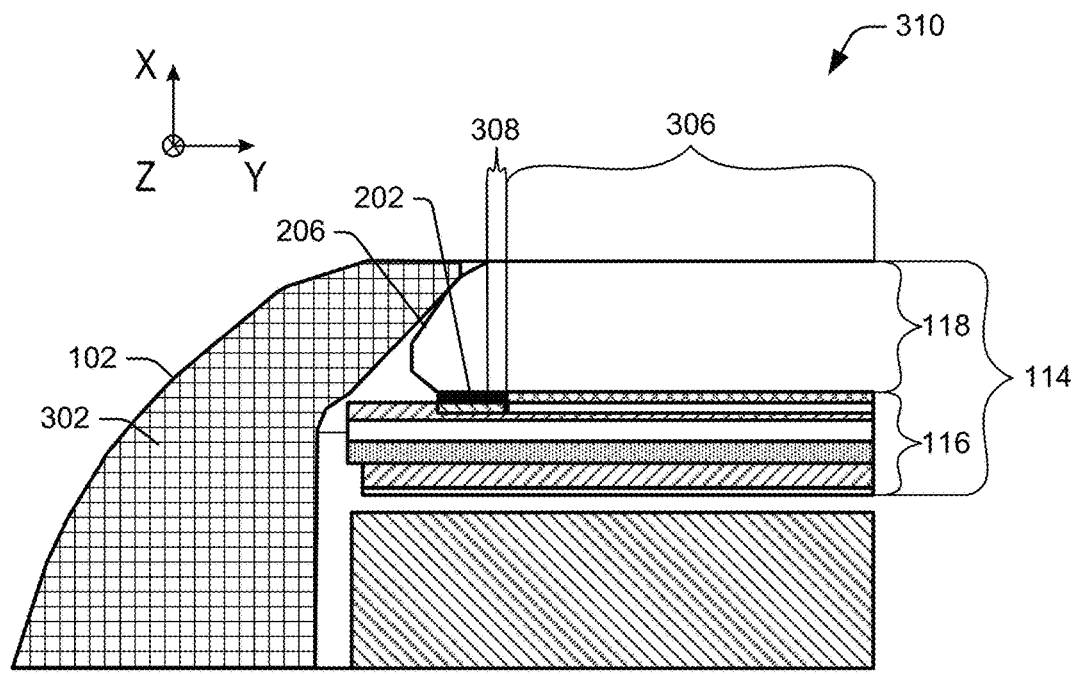

FIGS. 3A and 3B illustrate a top view and a partial, cross-sectional view, respectively, of an example portable electronic device 102 (e.g., mobile phone 102-1) in which uniformly narrow display bezels can be implemented. As illustrated, the portable electronic device 102 includes a housing 302 that houses a display 114 having a display panel stack including a display module 116 and a cover layer 118. The housing 302 may define an opening whose area is larger than the area of a top face (e.g., top face 208) of the cover layer 118. The width and height of the cover layer 118 may be larger than the width and height of the opening. In such a configuration, the housing 302 can house the display 114 such that the top face of the cover layer 118 may extend beyond or be flush to the housing 302. Further, the housing 302 can protect side faces (e.g., side face 210) of the cover layer 118.

The display 114 can be configured to have an active area 306 and a display bezel 308. In more detail, the display module 116 emits light using a pixel array, or any other active light-emitting element. The emitted light passes through an area of the translucent cover layer 118, defining an active area 306, to be perceived by a user. An opaque border 202 added to an underside surface (e.g., bottom face 212) of the cover layer 118 can hide routing circuitry supporting the display module 116 and may obstruct the passage of light emitted from the display module 116, defining a display bezel 308 (e.g., an inactive area). The display bezel 308 may be perceived by a user as a black region underneath the cover layer 118 surrounding the active area 306.

Due to the large chamfer 206 and the configuration of the cover layer 118 in the housing 302 of the portable electronic device 102, a significant portion of the opaque border 202 may be imperceptible to a user, resulting in narrow display bezels. Further to the above descriptions, the narrow display bezels can uniformly extend along the perimeter of the active area 306, even at a top and bottom section of the portable electronic device 102.

Figure 4:
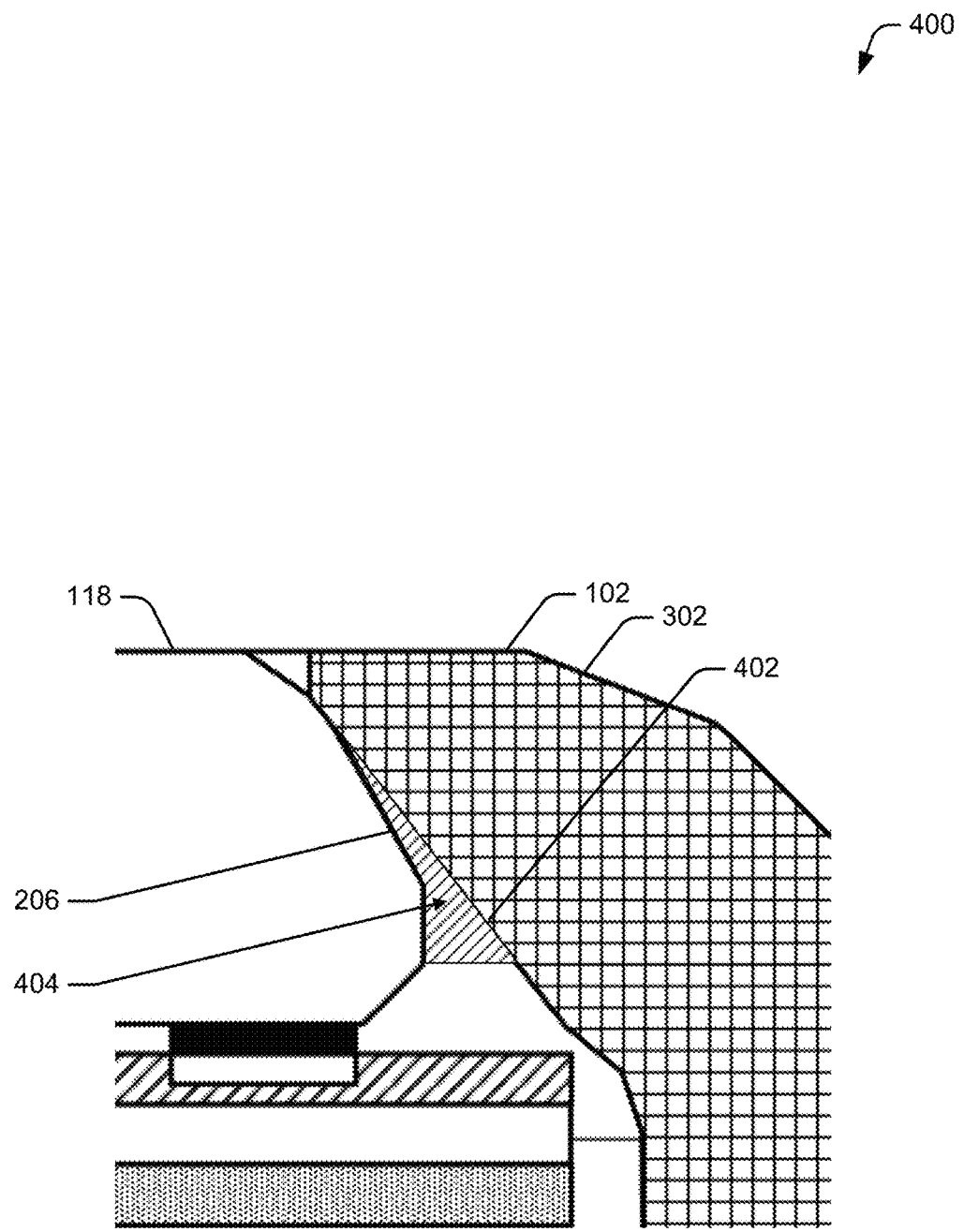
FIG. 4 illustrates a zoomed-in, partial, cross-sectional view of an example portable electronic device in which uniformly narrow displays bezels may be implemented.

FIG. 4 illustrates a zoomed-in, partial, cross-sectional view 400 of an example portable electronic device 102 in which uniformly narrow displays bezels may be implemented. FIG. 3 is described in the context of the portable electronic device 102 of FIGS. 1-3B. As illustrated the portable electronic device 102 includes housing 302 that houses a display panel stack having the cover layer 118. The cover layer 118 includes the large chamfer 206. The housing may define an interior face 402 parallel or subparallel to the chamfered face. The interior face may be angled any degrees in a range of one to eighty-nine degrees from a horizontal plane defined by the top face of the cover layer 118. In a configuration, the interior face 402 may contact the cover layer 118 at any point along the chamfered face. During manufacturing, an adhesive 404 (e.g., glue, sealant) may be applied to cover layer 118 and/or the interior face 402 such that the adhesive 404 fills the area between the chamfered face and the interior face 402. For example, a waterproof sealant can be applied to the chamfered face of the cover layer 118. The chamfered face may be angled to optimize fluid flow of the sealant such that it covers the full face of the chamfered face before mechanical adhering. The chamfered face of the cover layer 118 may then be bonded to the interior face 402 of the housing 302 of the portable electronic device 102.

Manufacturing Assembly Techniques

Figure 5:
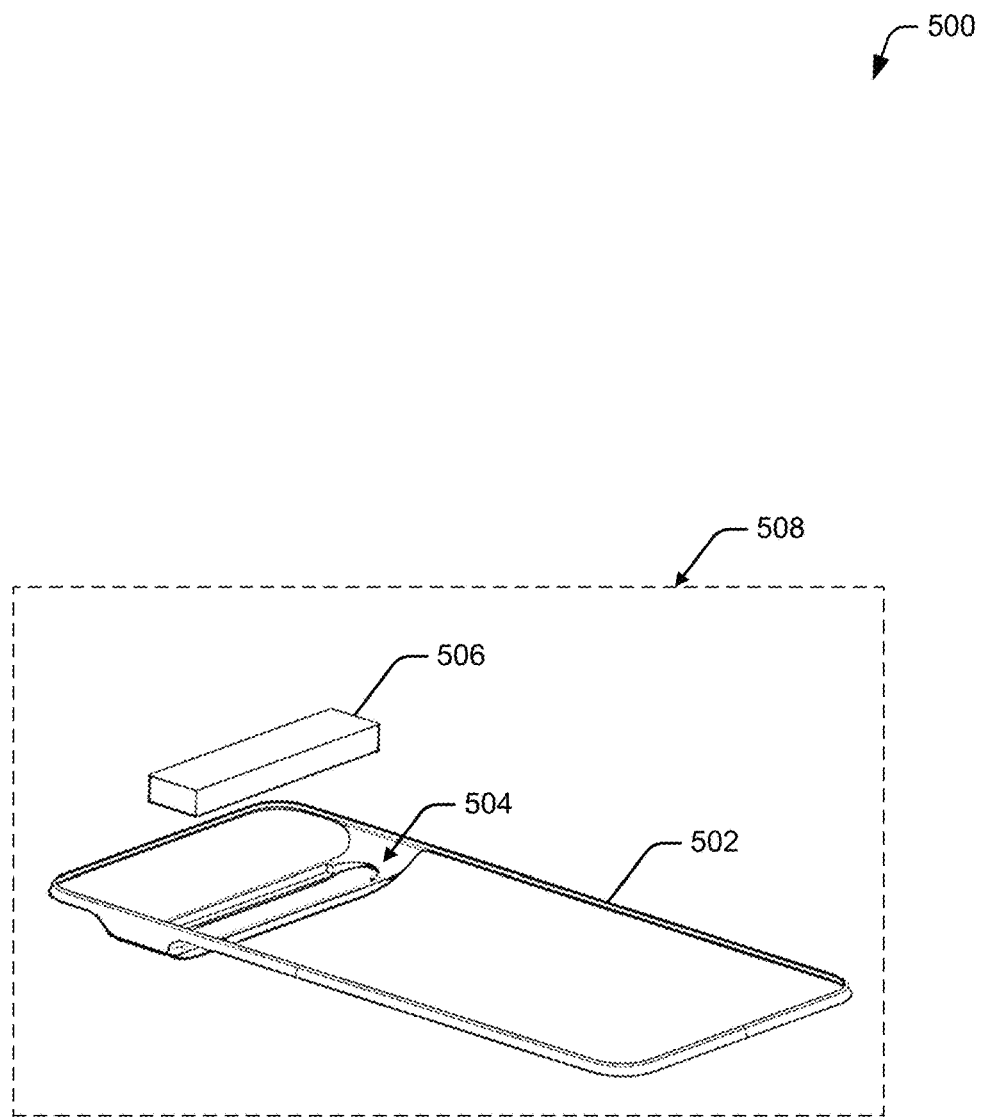
FIG. 5 illustrates a first manufacturing step in assembling a portable electronic device configured to implement uniformly narrow display borders.

FIG. 5 illustrates a first manufacturing step 500 in assembling a portable electronic device (e.g., mobile phone 102-1) configured to implement uniformly narrow display borders. As illustrated, a middle housing section 502 of a housing (e.g., housing 302) of a portable electronic device (e.g., portable electronic device 102) may include a camera bump 504 to house sensor(s) 506 (e.g., sensor(s) 112). The sensor (s) 506 may include a rear-facing image-capture device. The sensor(s) 506 is assembled with the middle housing section 502, forming a middle housing section and sensor(s) assembly 508.

Figure 6:
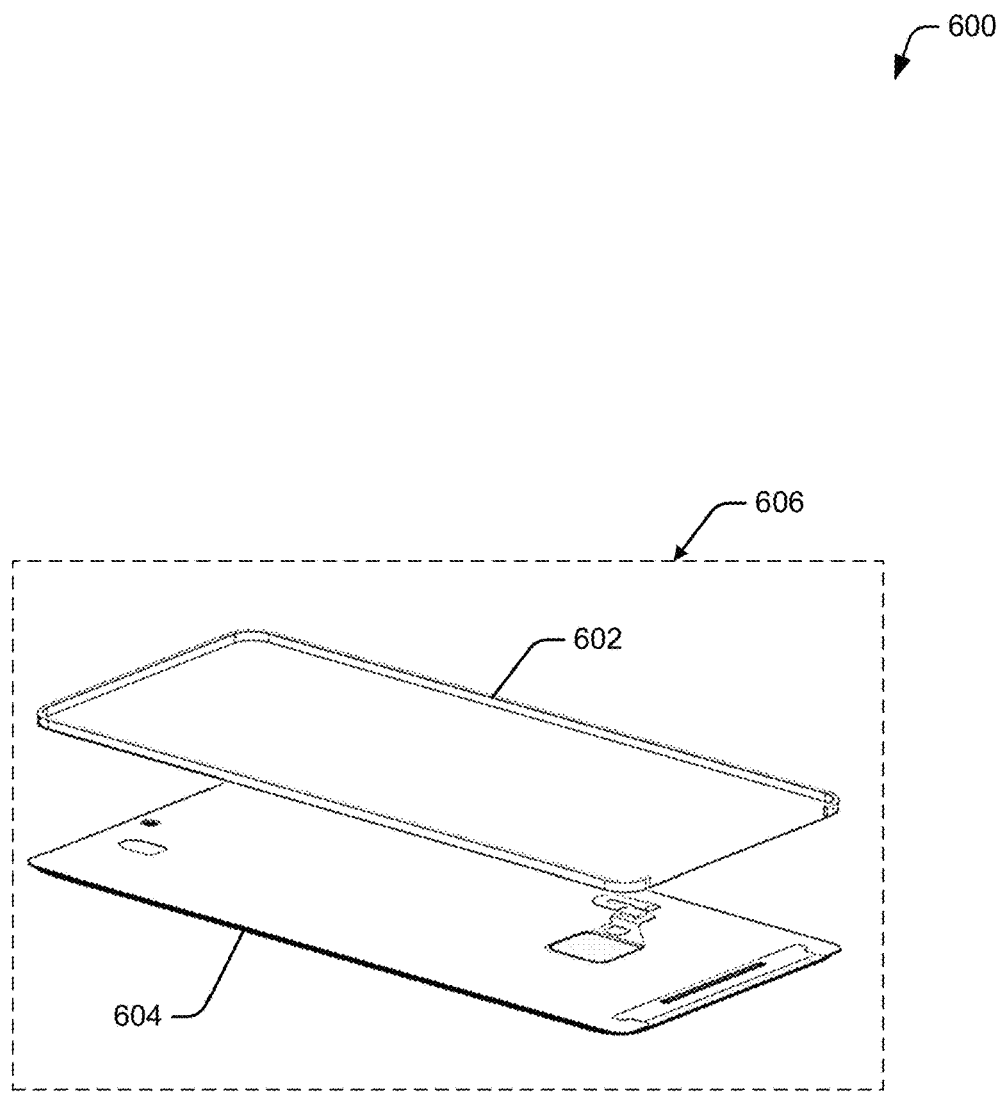
FIG. 6 illustrates a second manufacturing step in assembling a portable electronic device configured to implement uniformly narrow display borders.

FIG. 6 illustrates a second manufacturing step 600 in assembling a portable electronic device configured to implement uniformly narrow display borders. FIG. 6 is described in context of the manufacturing step illustrated in FIG. 5. As illustrated, a back housing 602 may be assembled with a display 604 (e.g., display 114) having a display panel stack, forming a back housing and display assembly 606. Assembling the back housing 602 and display 604 may involve adhering (e.g., glue, sealant) the display 604 to the back housing 602, mechanically fixing (e.g., screws) the back housing 602 to the display 604, or any other similar method.

Figure 7:
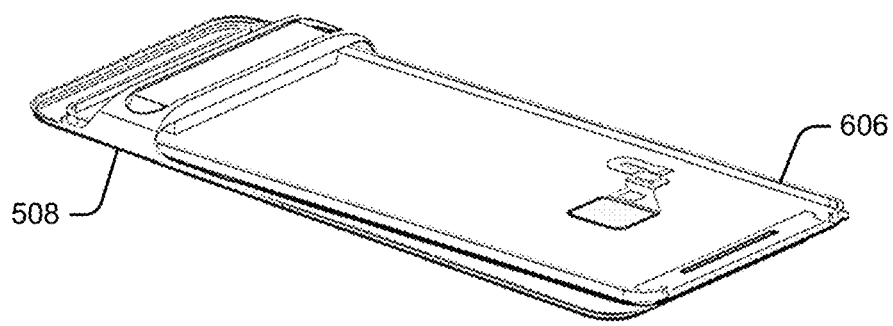
FIG. 7 illustrates a third manufacturing step in assembling a portable electronic device configured to implement uniformly narrow display borders.

FIG. 7 illustrates a third manufacturing step 700 in assembling a portable electronic device configured to implement uniformly narrow display borders. FIG. 7 is described in context of the manufacturing steps illustrated in FIGS. 5 and 6. As illustrated, the back housing and display assembly 606 is added into the middle housing section and sensor(s) assembly 508. The addition may involve inserting the middle housing section and sensor(s) assembly 508 at an angle.

Figure 8A:
FIGS. 8A, 8B, and 8C further illustrate techniques to achieve a third manufacturing step 700 in assembling a portable electronic device configured to implement uniformly display borders.
Figure 8B:
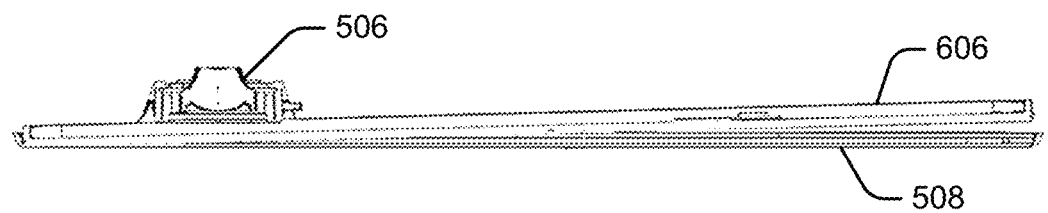
Figure 8C:

FIGS. 8A, 8B, and 8C further illustrate techniques to achieve a third manufacturing step 700 in assembling a portable electronic device configured to implement uniformly narrow display borders. FIGS. 8A, 8B, and 8C are described in context of the manufacturing steps illustrated in FIGS. 5-7. FIG. 8A illustrates the middle housing section and sensor(s) assembly 508 having front-loaded sensor(s) 506 pushed up and held in a position 802. FIG. 8B illustrates a back housing and display assembly 606 tilted, in an implementation, at 2.5 degrees from a horizontal plane defined by the housing section and sensor(s) assembly 508 and added into the middle housing section and sensor(s) assembly 508. In such a manner, the display panel stack, including the cover layer (e.g., cover layer 118) and display module (e.g., display module 116), is rear-loaded into the housing section and sensor(s) assembly 508 of the portable electronic device. FIG. 8C illustrates the back housing and display assembly 606 residing in the housing section and sensor(s) assembly 508. Further illustrated, the front-loaded sensor(s) 506 is pushed down 804.

Figure 9:
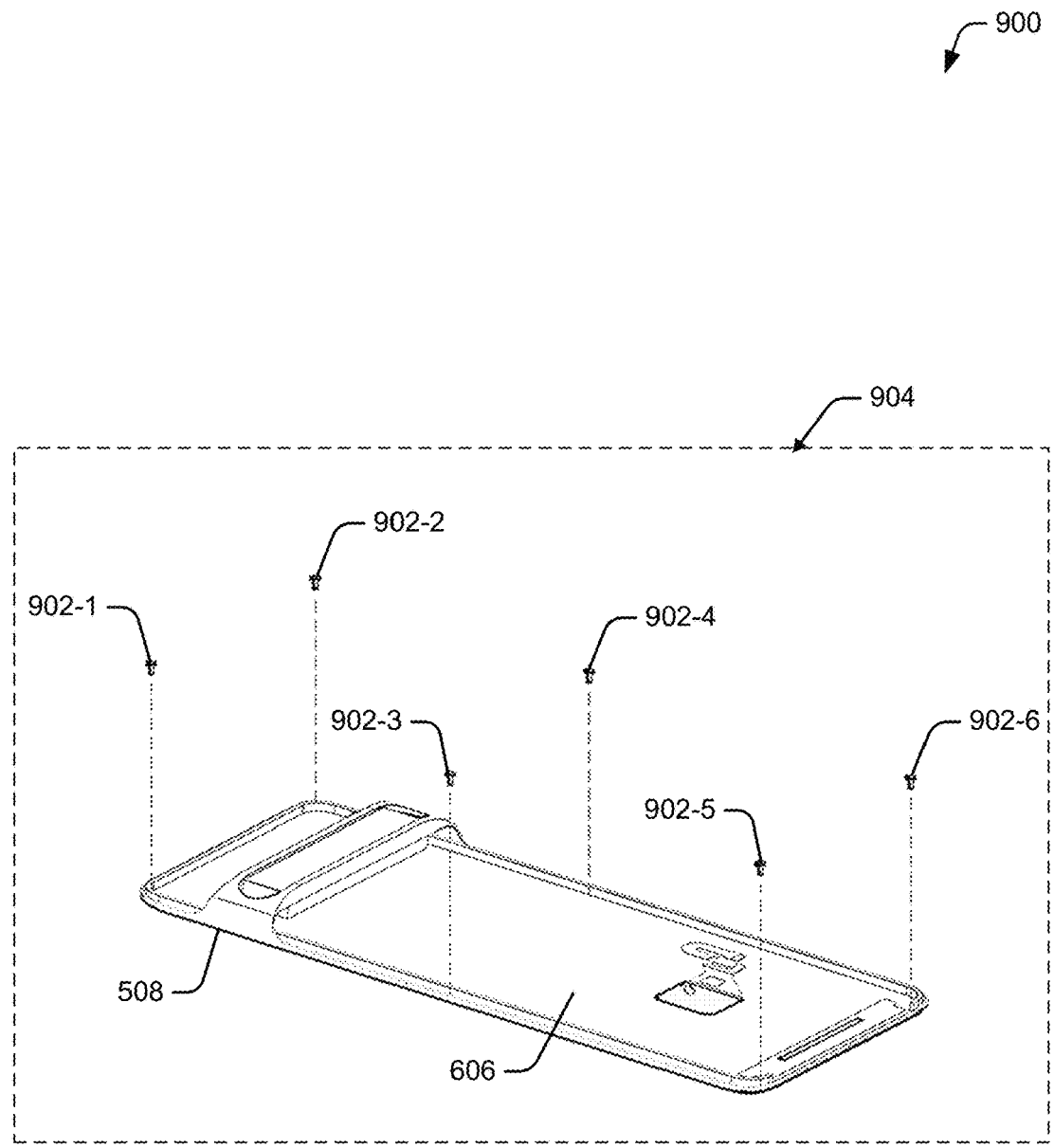
FIG. 9 illustrates a fourth manufacturing step in assembling a portable electronic device configured to implement uniformly narrow display borders.

FIG. 9 illustrates a fourth manufacturing step 900 in assembling a portable electronic device configured to implement uniformly narrow display borders. FIG. 9 is described in context of the manufacturing steps illustrated in FIGS. 5-8D. As illustrated, the back housing and display assembly 606 may be assembled to the middle housing section and sensor(s) assembly 508 using screws 902 (e.g., screw 902-1, screw 902-2, screw 902-3, screw 902-4, screw 902-5, screw 902-6), forming a front assembly 904. In other implementations, the two assemblies can be assembled together using an adhesive.

Figure 10:
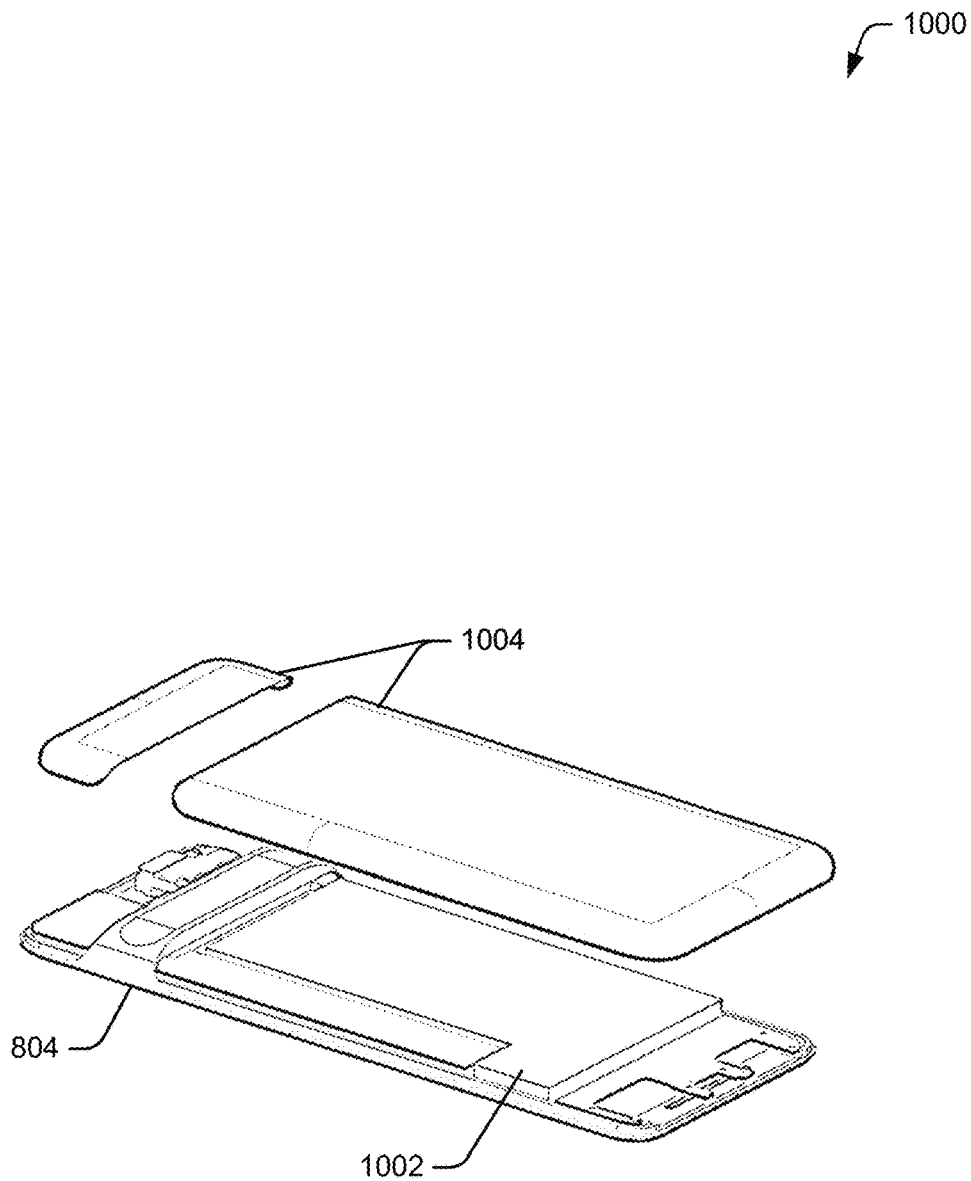
FIG. 10 illustrates a fifth manufacturing step in assembling a portable electronic device configured to implement uniformly narrow display borders.

FIG. 10 illustrates a fifth manufacturing step 1000 in assembling a portable electronic device configured to implement uniformly narrow display borders. FIG. 10 is described in context of the manufacturing steps illustrated in FIGS. 5-9. As illustrated, other components (e.g., processors, battery, circuitry) 1002 and a back housing 1004 may be assembled to the front assembly 804, forming a portable electronic device having narrow display borders.

In such a configuration, the cover layer may be comparatively thin (e.g., 1.2 mm), facilitating a lighter portable electronic device while still affording users a larger active area. Further, the portable electronic device is designed in an aesthetic and compact package. If the portable electronic device utilizes adhesive during the manufacturing assembly, the portable electronic device can also provide waterproofing capabilities. In addition to the above descriptions, with the back housing 602 assembled behind the display 604 and assembled to the middle housing section 502 using screws 902, the middle housings section 502 supports the display, preventing external forces on the cover layer stressing the adhesive bond (e.g., adhesive 404).

What is claimed is:

1. A portable electronic device comprising:
 a cover layer having a top face and an opposing bottom face, the cover layer including at least one chamfer between the top face and the bottom face, the at least one chamfer defining a chamfered face, the chamfered face angled between zero and ninety degrees from a horizontal plane defined by the top face; and
 a housing configured to house the cover layer, the housing comprising:
  an opening that is larger than a surface area of the top face; and
  an interior face contiguous with the opening in the housing, the interior face configured to extend over at least portions of the chamfered face in a direction parallel to the horizontal plane and provide a force perpendicular to and at contact the chamfered face of the cover layer sufficient to enable the housing to mechanically retain the cover layer.

2. The portable electronic device of claim 1, wherein the cover layer is composed of glass shaping a chamfered polyhedron.

3. The portable electronic device of claim 1, wherein the cover layer is rear-loaded to enable the cover layer to reside within the housing.

4. The portable electronic device of claim 1, wherein the chamfered face is angled at approximately 62 degrees from the horizontal plane defined by the top face and extends a full perimeter of the cover layer.

5. The portable electronic device of claim 4, wherein the chamfered face angled at approximately 62 degrees possesses a front-facing portion of approximately 0.18 millimeters.

6. The portable electronic device of claim 1, wherein the interior face of the housing is subparallel to the chamfered face, the interior face angled to contact the chamfered face at a point.

7. The portable electronic device of claim 1, wherein the chamfered face is bonded to the interior face of the housing using an adhesive.

8. The portable electronic device of claim 7, wherein the adhesive is a waterproof glue.

* * * * *